United States Patent [19]

Kurosawa et al.

[11] Patent Number: 4,574,980

[45] **Date of Patent: * Mar. 11, 1986**

[54] VENDING MACHINE DISPENSING MECHANISM

[75] Inventors: Akihito Kurosawa; Osamu Anazawa, both of Maebashi, Japan

[73] Assignee: Sanden Corporation, Isesaki, Japan

[ * ] Notice: The portion of the term of this patent subsequent to Sep. 24, 2002 has been disclaimed.

[21] Appl. No.: 619,298

[22] Filed: Jun. 11, 1984

[30] Foreign Application Priority Data

Jun. 10, 1983 [JP] Japan ................................ 58-102911

[51] Int. Cl.4 .......................... B65G 59/06; B65H 3/44

[52] U.S. Cl. ...................................... 221/116; 221/298

[58] Field of Search ........................ 221/112, 114–118, 221/123, 126, 127, 128, 131, 132, 221, 222, 251, 295, 297, 298, 299, 300, 301; 414/125, 126

[56] References Cited

U.S. PATENT DOCUMENTS

| | | | |
|---|---|---|---|
| 1,270,194 | 6/1918 | Nybak | 221/298 X |
| 2,435,526 | 2/1948 | Young et al. | 221/295 X |
| 3,055,548 | 9/1962 | Allegri | 221/131 X |
| 3,741,410 | 6/1973 | Henschke et al. | 221/222 |
| 4,013,179 | 3/1977 | Fluck | 221/251 X |
| 4,423,828 | 1/1984 | Tanaka et al. | 221/131 X |

FOREIGN PATENT DOCUMENTS

| | | | |
|---|---|---|---|
| 2006315 | 8/1971 | Fed. Rep. of Germany | 221/251 |

*Primary Examiner*—F. J. Bartuska

*Attorney, Agent, or Firm*—Banner, Birch, Mckie & Beckett

[57] ABSTRACT

An article dispenser for dispensing articles from a vending machine includes an article storage area which has a bottom opening through which articles are dispensed and a front opening through which articles are loaded in a manner to form two vertically adjacent stacks. An article dispensing mechanism successively dispenses the lowermost articles stacked in the storage area through such bottom opening by the mechanism including a rotatable shaft which vertically extends within the storage area to divide the storage area into the two vertical stacks or columns. A control plate is fixed to the lower end of the rotatable shaft to control the operation of a pair of pivotally mounted doors positioned below the two vertical stacks of articles, respectively. As these doors open and close upon rotation of the rotatable shaft, the lowermost articles in the storage area are successively dispensed. The article dispensing mechanism further includes an article holder mechanism located at the lower end of the storage area to hold the articles in one stack, except for the lowermost article, in a stacked position during the opening of the door. The holder mechanism includes a holding surface portion which extends from one side of the rotatable shaft to frictionally engage the adjacent article in one stack to hold this article between the holding surface portion and the inner surface of the storage area, and a projection extending from the rotatable shaft at a level disposed below the holding surface portion. The holder mechanism further includes a pushing member extending from the rotatable shaft in a direction opposite to the direction of such projection, the pushing member acting to guide the lowermost article in a stack toward the outside of storage area bottom opening.

4 Claims, 15 Drawing Figures

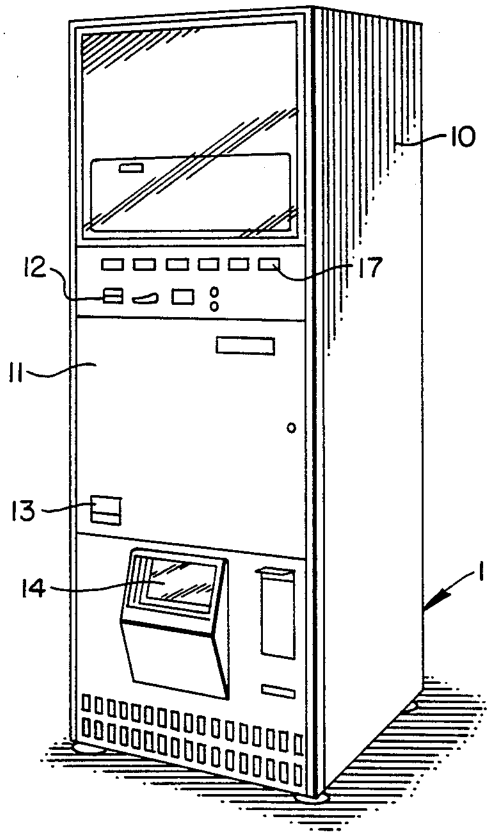
FIG. 1.
FIG. 2.
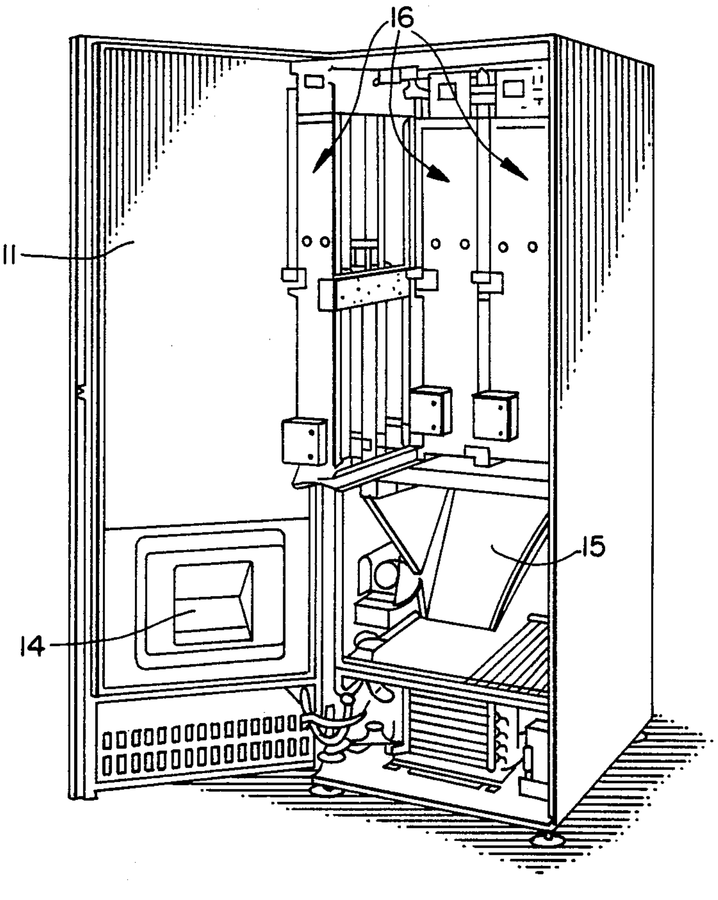

VENDING MACHINE DISPENSING MECHANISM

TECHNICAL FIELD

This invention relates to vending machines, and more particularly to a dispensing mechanism adapted for dispensing rectangular, parallelepiped or cube shaped paper cartons containing a beverage or other liquid.

BACKGROUND OF THE INVENTION

Various types of dispensing mechanisms have been used depending on the types of food products or goods being vended. One known type of dispensing mechanism is a spiral type which is used to vend bottles or cans.

Spiral type dispensing mechanisms include a vertical shaft with end portions journaled at the upper and lower ends of a storage area for the articles. A spiral or helical element is disposed around and connected to the vertical shaft for rotation with the shaft. The articles or packaged goods are loaded along the spiral element and the vertical shaft. These packages are moved downardly by the rotation of the spiral element and delivered one by one from the lower end of the shaft.

In this type of mechanism, the spiral element is located adjacent to each of the packages i.e., the spiral element extends between the upper and lower portions of each package and forms an axial gap between adjacent packages. However, since each package must be loaded into the axial gaps of the spiral element one by one, the number of articles or packages which can be loaded into a predetermined space is reduced. Also, loading of the articles into the dispensing mechanism is complicated and time consuming.

Another type of dispensing mechanism, known as a chain-elevator type dispensing mechanism, is shown in U.S. Pat. No. 3,193,135. Chain-elevator type dispensing mechanisms are suitable for vending packages or cartons. A chain-elevator type dispensing mechanism includes a plurality of supporting elements each of which carries articles or packages. The supporting elements are connected to a chain, which is moved vertically by a motor. In this mechanism, the construction of the operative elements is very complicated, and the loading of packages or articles is difficult.

A slant shelf type dispensing mechanism, such as shown in U.S. Pat. No. 3,276,624 is another type of known dispensing mechanism for vending bottles or cans. A slant shelf type dispensing mechanism includes at least one slanted shelf member which acts as a guide for dispensing articles, and a delivery member for dispensing the articles, one by one, from the slanted shelf member. However, construction of the mechanism is very complicated and expensive, and loading of the articles into the storage area is complicated. Also, since the distance between the delivery member and a delivery tray is generally long, articles may be damaged during delivery by striking against the delivery tray.

SUMMARY OF THE INVENTION

It is a primary object of this invention to provide a dispensing mechanism for vending machines which is uncomplicated and in which articles are positively held in a narrow space.

It is another object of this invention to provide a dispensing mechanism for vending machines in which loading of articles can be accomplished expeditiously in one simple operation.

It is still another object of this invention is to provide a dispensing mechanism for vending machines in which each of the articles is effectively released and ejected from the storage area within the machine.

It is a further object of this invention to realize the above objects employing simple construction features with very low cost.

A dispensing mechanism for vending machines according to this invention includes an article storage area for holding articles in a stacked disposition, dispensing of these articles being controlled by a signal generated by a vending switch. The dispensing machine comprises a pair of rectangular-shaped flappers or doors which are disposed at a bottom opening of the storage area to block the exit of articles through this bottom opening. These doors are pivotally supported by support shafts, one support shaft extending from the center portion of the storage area back plate and the other support shaft extending from the storage area front plate. Both shafts lie on the same axis. A rotatable shaft extends vertically within the storage area and is rotatably supported by an upper plate and a support element which is fixed to and extends from the back plate. A driving mechanism is attached to the upper plate and connected to the rotatable shaft. A control member is fixed on the lower portion of the rotatable shaft and contacts the under surface of the doors to control the opening and closing of the doors. A holder member is removably affixed to the rotatable shaft to hold all of the stacked articles except the lowermost article while the lowermost article is being dispensed past an open door through the bottom opening leading from the storage area.

The holder member is provided with a holding surface portion radially projecting from the vertical rotatable shaft to frictionally engage an article within the article storage area and a projection extending from the vertical shaft at a position below the holding surface portion adjacent to the lowermost article stacked within the article storage area. Also, an article pushing member projects from the rotatable shaft at a position on the opposite side of the shaft from the projection on the holder member, such pushing member acting to push the lowermost article toward the outside of the bottom opening leading from the storage area.

Further objects features and other aspects of this invention will be better understood from the following detailed description of preferred embodiments of this invention when taken with reference to the annexed drawings.

BRIEF DESCRIPTION OF THE DRAWINGS

FIG. 1 is a perspective view of a vending machine containing an article dispenser according to the invention.

FIG. 2 is a perspective view of the vending machine of FIG. 1 with the loading door opened.

DETAILED DESCRIPTION OF THE PREFERRED EMBODIMENTS

Figure 3:
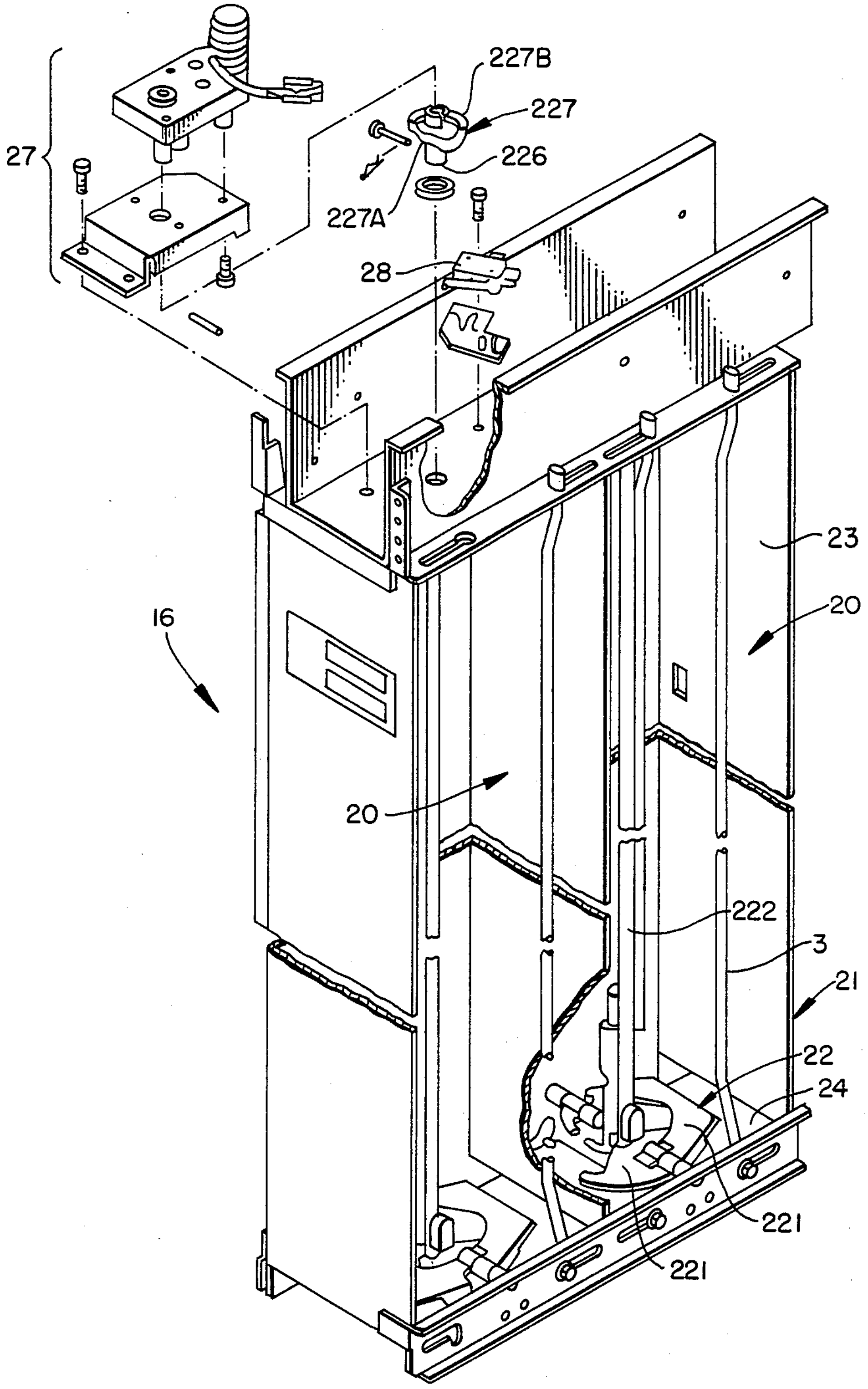
FIG. 3 is an exploded perspective view of one article dispenser useable in the vending machine of FIG. 2.

FIGS. 1 and 2 illustrate an article vending machine which includes a cabinet 10 having a loading door 11 which extends substantially across the face of cabinet 10 and is hinged along the left vertical edge of cabinet 10 in a conventional manner (not shown). Vending machine 1 also is provided with coin slot 12 and a coin return opening 13 on the front face of loading door 11. A vending stage 14 which communicates with a interiorly disposed discharge hopper 15 (FIG. 2), is mounted in loading door 11. Discharge hopper 15 is located beneath a plurality of dispensers 16, three dispensers 16 being used in vending machine 1. A plurality of selector push buttons or switches 17 are provided across the upper front region of loading door 11.

As shown in FIG. 3, each dispenser 16 is comprised of two dispensing mechanism units 20 mounted next to one another with a common partition wall extending between the pair of units 20. Each unit 20 includes an article storage area 21 and a dispensing mechanism 22.

Figure 4:
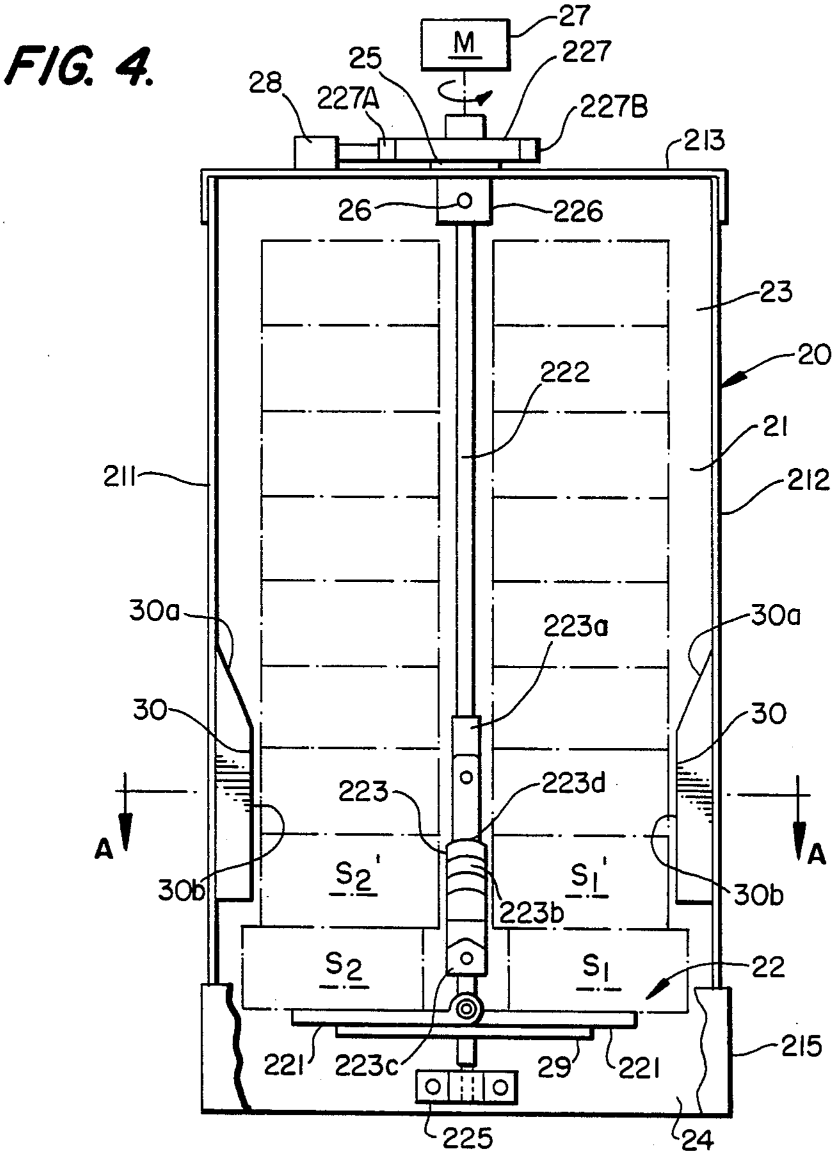
FIG. 4 is a front elevational view of a dispenser according to the invention with parts broken away.
Figure 5:
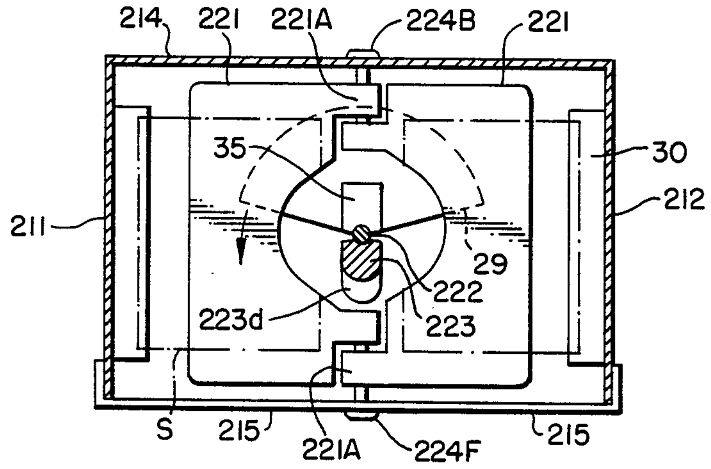
FIG. 5 is a sectional view taken on line A—A of FIG. 4.

Each article storage area 21 of a dispensing mechanism unit 20 comprises, as seen in FIGS. 4 and 5, vertically disposed side plates 211 and 212, one of which forms the common partition wall between a pair of units 20, as well as an upper plate 213 and a back plate 214. A front support plate 215 extends across the front lower portion of side plates 211 and 212, and is connected to both side plates. An opening 23 is defined between side plates 211 and 212, upper plate 213 and support plate 215. Loading of articles into the storage area 21 is done through opening 23 with this opening being provided with a suitable article retainer, such as rod 3 (FIG. 3), to prevent articles from dropping out of storage area 21 through opening 23. Storage area 21 also has a botton discharge opening 24 leading from storage area 21 and through which articles are dispensed.

A dispensing mechanism 22 is disposed within article storage area 21 at the lower end thereof. Mechanism 22 comprises a pair of flappers or doors 221, a rotatable shaft 222, a holder member 223 and a driving mechanism for rotating rotatable shaft 222.

A support shaft 224F (FIG. 5) is removably attached to front support plate 215 and another support shaft 224B is removably attached to back plate 214. Support shafts 224F and 224B are axially spaced from one another and are aligned along a common axis. Each rectangular-shaped door 221 is pivotally supported by both support shafts 224F and 224B through a pair of supporting portions 221A extending from an edge of the door 221 adjacent the rotatable shaft 222.

The pair of rectangular-shaped doors 221 are disposed in discharge opening 24 leading from storage area 21 to control the discharge of articles through opening 24. Rotatable shaft 222 extends vertically through the central portion of storage area 21 to divide storage area 21 into two columns for stacking articles in two columns or stacks at the left and right sides of rotatable shaft 222. Thus, doors 221 are placed beneath storage area 21, one door being positioned below each stack of articles S. The lower end portion of rotatable shaft 222 is rotatably supported by a support element 225 which is fixed to and extends from the inner surface of back plate 214. The upper end portion of rotatable shaft 222 is connected to the driving mechanism which is attached to upper plate 213.

The driving mechanism includes a coupling member 226 which is rotatably supported by upper plate 213 through bearing 25. Rotatable shaft 222 is connected to coupling member 226 by a pin 26. Coupling member 226 is also connected to a motor 27 through a speed reduction mechanism. Thus, rotatable shaft 222 and motor 27 are connected by coupling member 226 whereby rotatable shaft 222 is driven by motor 27 through coupling member 226 and the speed reduction mechanism.

As best seen on FIG. 3, coupling member 226 includes a cam portion 227 which has two equiangular spaced cut-out portions 227A and 227B circumferentially spaced on its peripheral surface. A switch element, such as microswitch 28, is mounted adjacent the outer periphery of cam portion 227 to control the operation of motor 27. The switch lever of microswitch 28 contacts the outer peripheral surface of cam portion 227 and moves in correspondence with the configuration of cam portion 227. The operation of microswitch 28 is thus controlled by the rotation of cam portion 227. In this embodiment, cut-out portions 227A and 227B are formed at an angular offset of 180° whereby the operation of motor 27 is stopped after shaft 222 rotates 180°. Motor 27 is selectively operated in response to the deposit of a predetermined coin value by a customer and stops after shaft 222 rotates 180° from its starting position.

As will be seen on FIGS. 4 and 5, rotatable shaft 222 also has an arc shaped control plate 29 fixed to its lower end portion. Control plate 29 contacts the under or back surfaces of doors 221. When control plate 29 is in contact with both doors 221, both doors 221 are held in a horizontal position so that control plate 29 effectively controls the pivoting of doors 221 to prevent discharge of any articles S. When control plate 29 is rotated to underlie or contact only one of the doors 221, the other door is free to pivot to an open position to permit discharge of an article S.

Holder member 223 is removably attached to one side portion of rotatable shaft 222 at a position adjacent its lower end portion. Thus, holder member 223 is at a level within storage area 21 to at least be aligned with one article which is stacked and located immediately above the lowermost article resting on the upper surface of a door 221. Holder member 223 also has a holding surface portion 223*b* radially projecting from shaft 222 at a position located below a slant portion 223*a*, this slant portion serving to align the articles which are to be acted upon by the holding member 223.

Side spacers 30 are removably attached to the inner surfaces of side plates 211 and 212 on the opposite sides of holder member 223 so that one articles is held between one of the side spacers 30 and holding surface portion 223*b* on holder member 223. Each side spacer 30 has a slanted surface portion 30*a* formed as a guide surface and an article holding surface 30*b*. The distance between article holding surface 30*b* and holding surface portion 223*b* of holder member 223 is selected to hold articles S between surfaces 223*b* and 30*b* when these surfaces are opposed to one another. An upwardly facing surface on holder member 223 disposed above holder surface portion 223*b* acts as a shoulder portion 223*b* to also support the articles S.

Also holder member 223 has a projection 223*c* extending therefrom at the lower end of member 223 to extend beneath the bottom or lower surface of the first article stacked above the lowermost article that is resting on door 221.

Rotatable shaft 222 likewise carries a guiding member 35 projecting therefrom at the same level as the level of projection 223*c*. Guiding member 35 projects in a direction opposite to the direction of projection 223*c*, member 35 acting as a pusher for an article that is resting on door 221.

Figure 6:
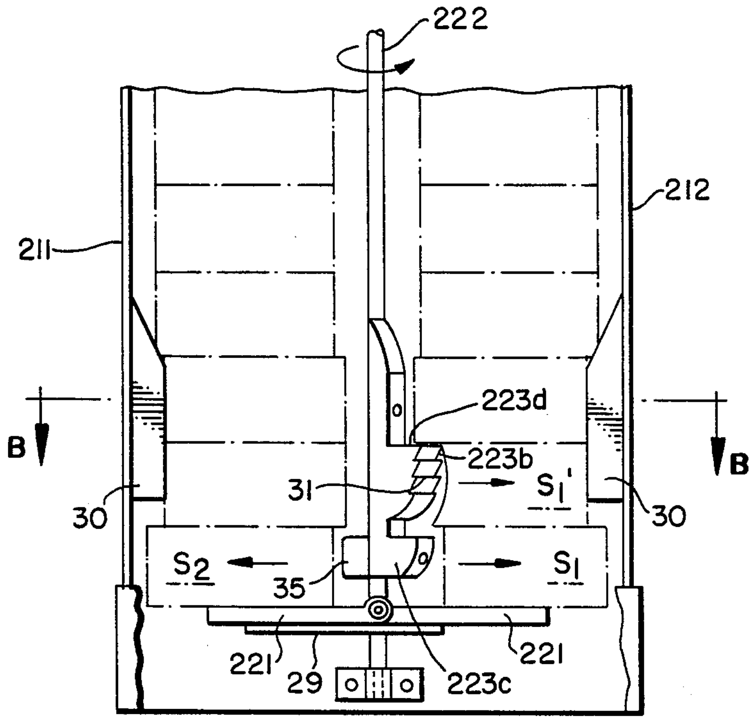
FIG. 6 is a partial front elevational view of the dispenser of FIG. 4 illustrating its operation.
Figure 12A:
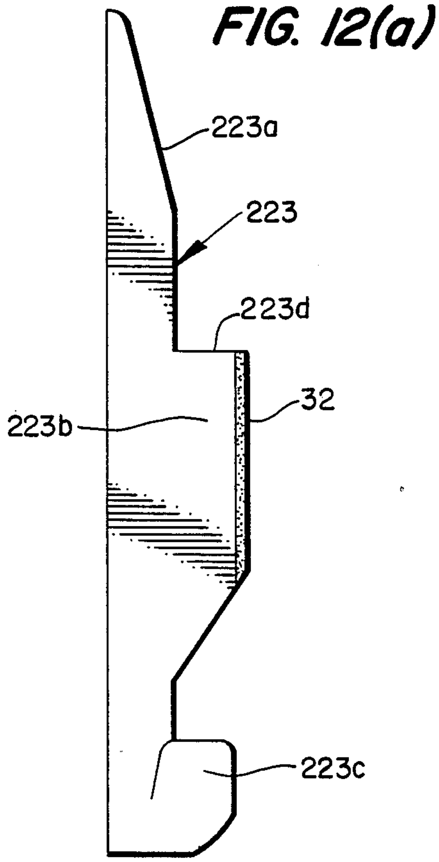
FIGS. 12(*a*) and (*b*) are a side view and a front view, respectively, of a holder member used in the dispenser of FIG. 4.
Figure 12B:
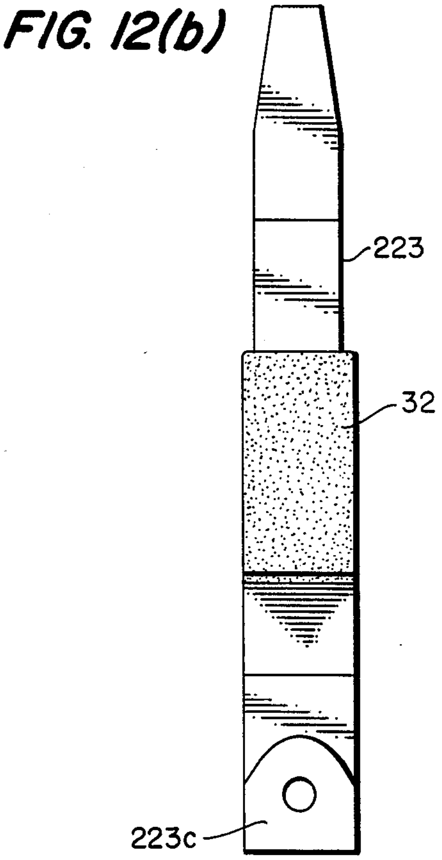

In the orientation of surfaces 223*b* and 30*b* where they are opposed to one another, downward movement of the stacked articles is prevented by the frictional resistance applied to the article immediately above the lowermost article that is gripped between the holding surface 223*b* and surface 30*b*. The holding capability or frictional resistance of surface 223*b* and 30*b* can be improved by including an antiskid element on these surfaces such as shown on FIGS. 6 or 12. In FIG. 6, holding surface 223*b* of holder member 223 is provided with a notched surface 31. In FIG. 12, a rubber sheet 32 is fastened to surface 223*b* to prevent slippage of articles.

Referring to FIGS. 6, 7, 8 and 9, the operation of the dispensing mechanism 22 for each unit 20 of an article dispenser 16 will be described. Articles or packages S which may contain a beverage or other liquid are loaded within storage area 21 through front opening space 23 and stacked on each door 221 to form two vertical column $S_1$ and $S_2$. When motor 27 is energized by a signal from the vending switch, rotatable shaft 222, holder member 223 and control plate 29 are simultaneously rotated through coupling member 226. The direction of rotation is shown by an arrow on FIG. 6.

During rotation of rotatable shaft 222, the edge of holding surface portion 223*b* of holder member 223 comes into contact with the side of one article $S_1'$ and pushes this article $S_1'$ toward side spacer 30 as shown by the arrow on FIG. 6. Projection 223*c* of holder member 223 and guide member 35 also come into contact with the sides of the lowermost articles $S_1$ and $S_2$, respectively, while these articles are resting on doors 221, pushing these two articles toward the inner surfaces of side plates 211 and 112. Thus, articles $S_1$ and $S_2$ are placed on the respective outer edges of doors 221.

Figure 7:
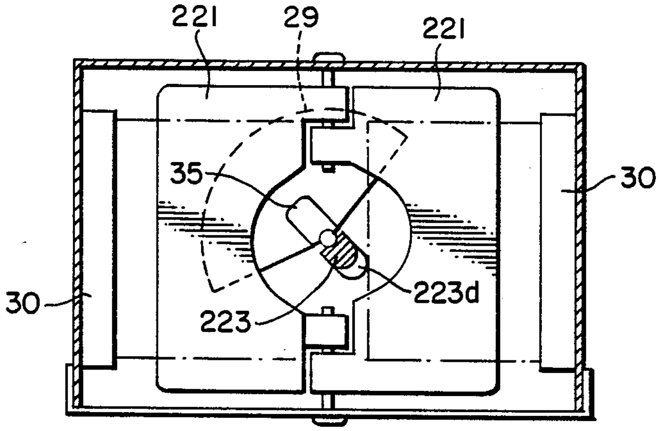
FIG. 7 is a sectional view taken on line B—B of FIG. 6.

As shown in FIGS. 6 and 7, just before control plate 29 moves from its underlying contacting position with both doors 221 to a position where it is in underlying contact with only one of these doors, i.e., the rotatable shaft 222 has rotated almost 90° from its initial position, the article $S_1'$ which is stacked immediately above the lowermost article $S_1$ becomes frictionally engaged between holding surface 30*b* of side spacer 30 and holding surface 223*b* of holder member 223.

Figure 8:
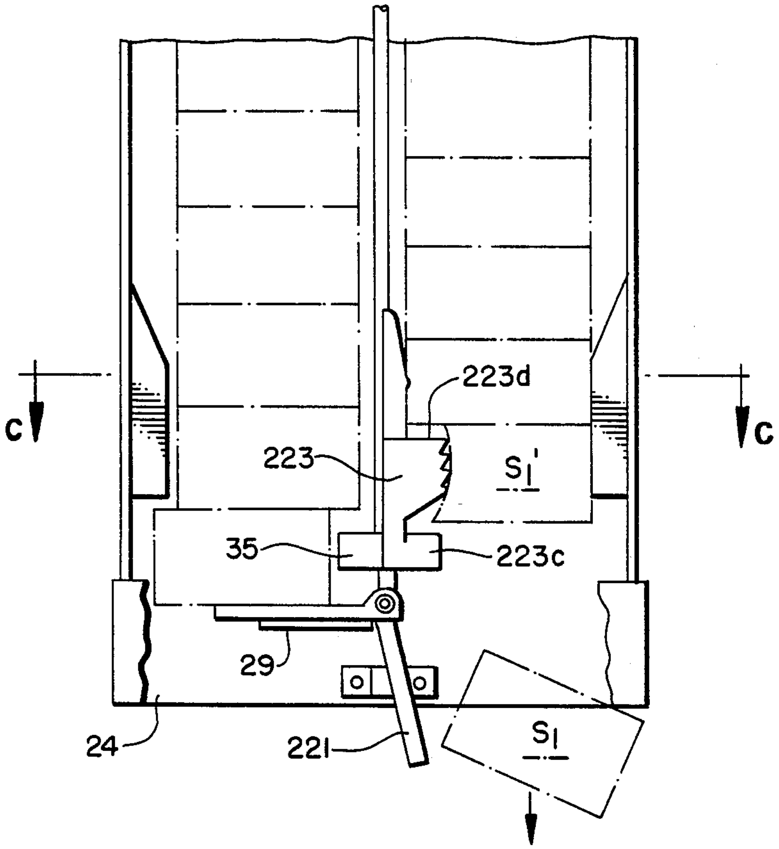
FIG. 8 is a partial front elevational view of the dispenser of FIG. 4 illustrating another stage of its operation.
Figure 9:
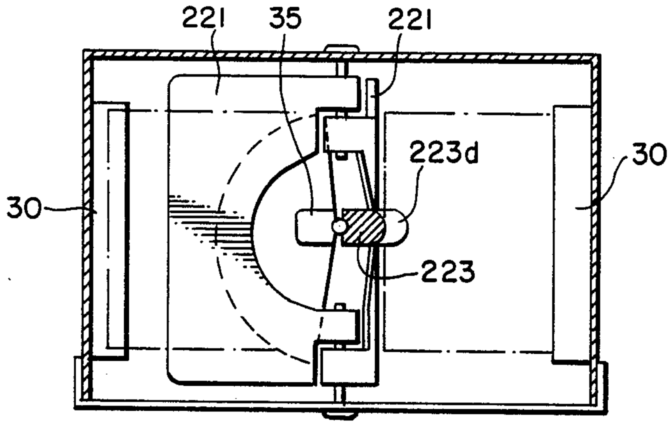
FIG. 9 is a sectional view taken on line C—C of FIG. 8.

When rotatable shaft 222 is rotated more than 90°, one of doors 221 is released from its horizontal position whereupon this one door is freed to pivot downward around support shafts 224F and 224B. Then, as shown in FIGS. 8–9, article $S_1$ that was resting on this one released door 221 is delivered through opening 24 to vending stage 14 by way of hopper 15 (FIGS. 1–2). At the same time, the other door 221 is kept in its horizontal position by control plate 29.

As holder member 223 and control plate 29 continue to rotate, control plate 29 again contacts the one released door 221 and pushes it upward to its former horizontal position.

At this moment, even if the article $S_1'$ may have moved downward by slippage thereof, the bottom surface of this article $S_1'$ is hooked and retained on projection 223*c* of holder member 223. Also, downward slippage of the remaining articles stacked on top of article $S_1'$ that is being held by frictional engagement between holder member 223 and side spacer 30 is positively prevented by the shoulder portion 223*d* of holder member 223 this shoulder portion underling the bottom of the lower article in this stack of remaining articles. Therefore, the articles are securely held within the dispensing mechanism.

Figure 10:
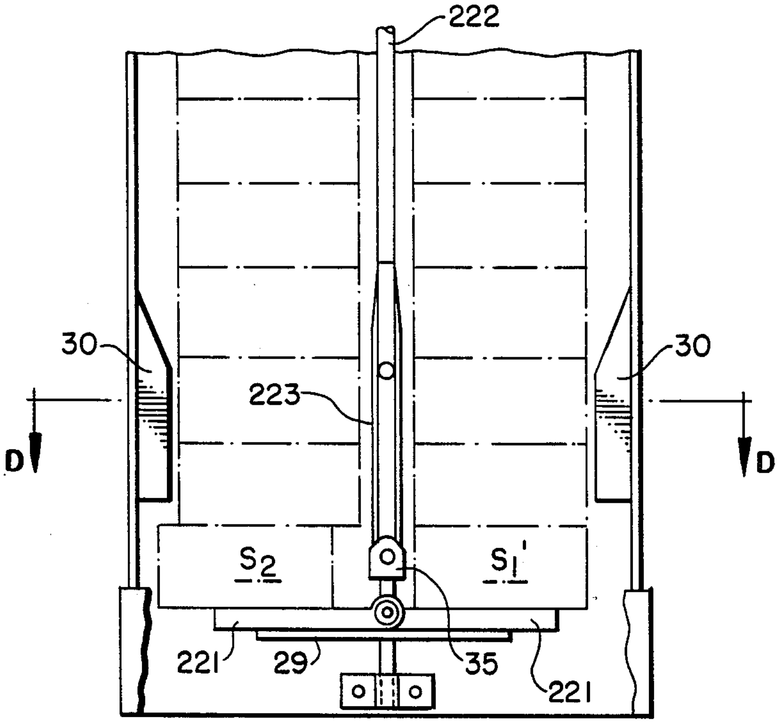
FIG. 10 is a partial front elevational view of the dispenser of FIG. 4 illustrating a different stage of its operation.
Figure 11:
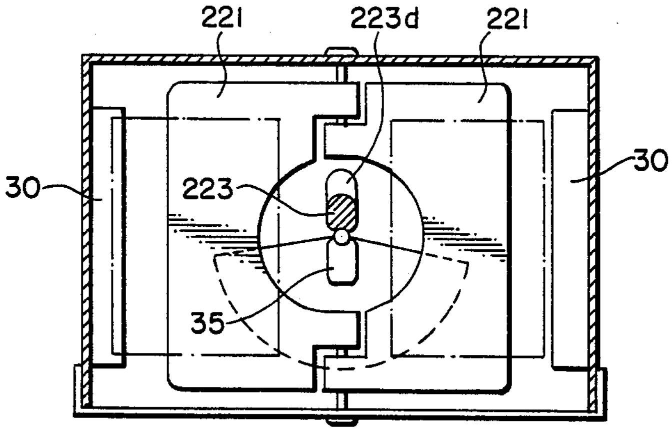
FIG. 11 is a sectional view taken on line D—D of FIG. 10.

After rotatable shaft 222 rotates 180°, switch 28 is operated by cam 227 to stop motor 27 with doors 221 and holder member 223 in the position shown in FIGS. 10 and 11. At this time, article $S_1'$ is released from its retention between holder member 223 and side spacer 30 whereupon article $S_1'$ slides down onto the top of door 221. Thereafter, the lowermost article $S_2$, disposed on the other door 221 is dispensed during the next operation of the dispensing mechanism 22 in the same manner described above in connection with article $S_1$.

Figure 13:
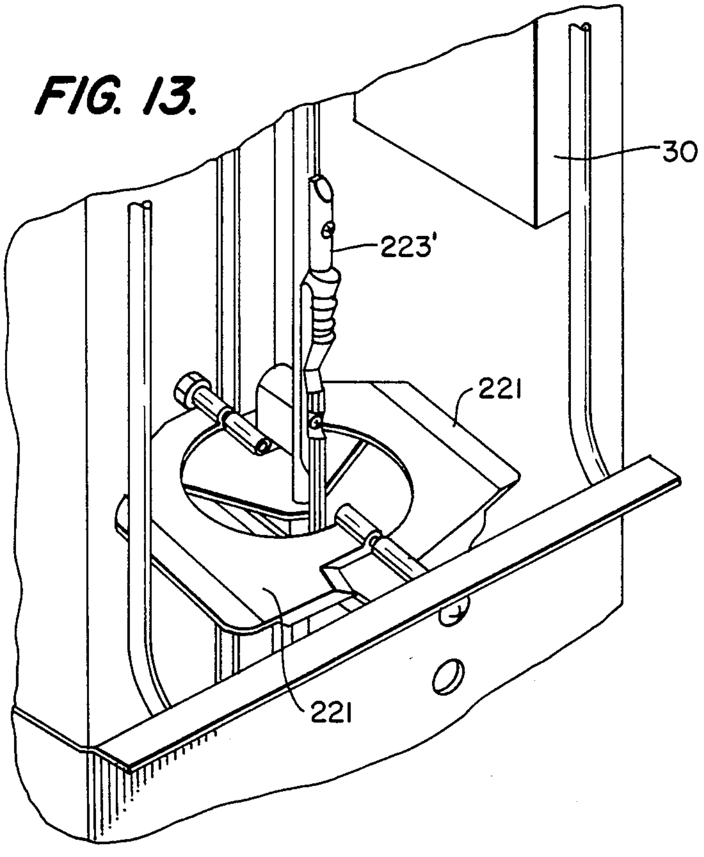
FIG. 13 is a partial perspective view of a dispenser according to another embodiment of this invention.
Figure 14:
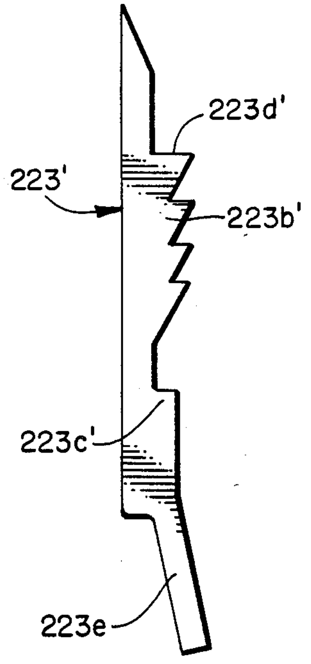
FIG. 14 is a side view of a holder member as used in the dispenser shown in FIG. 13.

Referring now to FIGS. 13 and 14, another embodiment of present invention is shown. This embodiment is directed to a modification of the holder member 223 of FIGS. 4–12 to improve the dispensing operation. Particularly the structure of the holder member in FIGS. 13 and 14 prevents the occurrence of rotating motion of the articles during the dispensing operation. Similar parts are represented by the same reference numerals used in FIGS. 4–12, but distinguished by each numeral having a prime (') designation. The description of similar parts is omitted for simplicity.

Holder member 223' of this embodiment has a guiding portion 223*e* projecting downwardly from the end surface of projection 223*c'*. This guiding portion 223*e* is disposed to extend through the cut-out portion of door 221 to guide the dispensing motion imparted to an article. Therefore, rotation of the articles during dispensing is prevented by guiding portion 223*e* of holder member 223'.

This invention has been described in detail in connection with preferred embodiments thereof, but these embodiments are merely examples and this invention is not to be considered as restricted thereto. It will be easily understood by these skilled in the art that other variations and modifications can be easily made within the scope of this invention as defined by the appended claims.

We claim:

1. In an article dispenser for dispensing articles from a vending machine including an article storage area in which the articles are held in two vertically adjacent columns in a stacked disposition above a bottom opening through which the lowermost articles are dispensed and dispensing mechanism to successively dispense the lowermost articles stacked in said storage area through said bottom opening, said dispensing mechanism including a rotatable shaft vertically extending within said storage area between the two vertically adjacent columns, a pair of doors pivotably supported within said storage area at the lower end of said rotatable shaft to essentially close the bottom opening leading from said storage area, control plate means fixed on the lower end of said rotatable shaft to contact with the underside surfaces of said doors for controlling the pivoting of each of said doors upon rotation of said rotatable shaft to selectively open and close said doors in successively dispensing the lowermost stacked article in the two vertically adjacent columns, and article holder means fixed on said rotatable shaft for holding all articles except the lowermost article in one of the vertical columns of articles in a stacked disposition during opening of the door associated with said one column by the action of said control plate means; the improvement comprising said article holder means having a holding surface portion radially projecting from said rotatable shaft to frictionally engage an article above the lowermost article, a projection at the lower end of said rotatable shaft adjacent to the lowermost article, and an article pushing member fixed on said rotatable shaft positioned on the opposte side of said shaft from said projection to act in pushing the lowermost article toward the outside of the bottom opening leading from said storage area.

2. The article dispenser of claim 1 wherein said article holder means further comprises side spacers mounted on the opposed inner surfaces of said storage area.

3. The article dispenser of claim 1 wherein said article holder means is provided with a shoulder portion defining an upwardly facing surface disposed above said holding surface portion.

4. The article dispenser of claim 1 wherein each of said pivotable doors has a cut-out portion along the edge adjacent said rotatable shaft for allowing said pivotably supported doors to pivot downward without engaging said rotatable shaft.

* * * * *